United States Patent
Palla et al.

(10) Patent No.: US 11,829,112 B2
(45) Date of Patent: *Nov. 28, 2023

(54) MACHINE CONTROL USING REAL-TIME MODEL

(71) Applicant: Deere & Company, Moline, IL (US)

(72) Inventors: Bhanu Kiran Reddy Palla, Bettendorf, IA (US); Nathan R. Vandike, Geneseo, IL (US); Federico Pardina-Malbran, Fort Collins, CO (US); Noel W. Anderson, Fargo, ND (US); Michael A. Waldo, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,570

(22) Filed: Mar. 17, 2023

(65) Prior Publication Data
US 2023/0213900 A1      Jul. 6, 2023

Related U.S. Application Data

(63) Continuation of application No. 17/344,517, filed on Jun. 10, 2021, now Pat. No. 11,650,553, which is a
(Continued)

(51) Int. Cl.
*G05B 13/00* (2006.01)
*G05B 13/04* (2006.01)
(Continued)

(52) U.S. Cl.
CPC ......... *G05B 13/048* (2013.01); *A01D 41/127* (2013.01); *A01D 41/1271* (2013.01); *A01D 41/141* (2013.01); *G05B 13/041* (2013.01)

(58) Field of Classification Search
None
See application file for complete search history.

(56) References Cited

U.S. PATENT DOCUMENTS

| | | |
|---|---|---|
| 3,568,157 A | 3/1971 | Downing et al. |
| 3,580,257 A | 5/1971 | Teague |

(Continued)

FOREIGN PATENT DOCUMENTS

| | | |
|---|---|---|
| AR | 108898 A1 | 10/2018 |
| AU | 20100224431 A1 | 4/2011 |

(Continued)

OTHER PUBLICATIONS

Martin et al., "Breakage Susceptibility and Harness of Corn Kernels of Various Sizes and Shapes", May 1987, 10 pages.
(Continued)

*Primary Examiner* — Paul B Yanchus, III
(74) *Attorney, Agent, or Firm* — Joseph R. Kelly; Kelly, Holt & Christenson, PLLC

(57) ABSTRACT

A priori geo-referenced data is obtained for a worksite, along with field data that is collected by a sensor on a work machine that is performing an operation at the worksite. A predictive model is generated, while the machine is performing the operation, based on the geo-referenced data and the field data. A model quality metric is generated for the predictive model and is used to determine whether the predictive model is a qualified predicative model. If so, a control system controls a subsystem of the work machine, using the qualified predictive model, and a position of the work machine, to perform the operation.

21 Claims, 11 Drawing Sheets

Related U.S. Application Data continuation of application No. 16/380,531, filed on Apr. 10, 2019, now Pat. No. 11,079,725.

(51) Int. Cl.
*A01D 41/14* (2006.01)
*A01D 41/127* (2006.01)

(56) References Cited

U.S. PATENT DOCUMENTS

| | | |
|---|---|---|
| 3,599,543 A | 8/1971 | Kerridge |
| 3,775,019 A | 11/1973 | Konig et al. |
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Sasse et al. |
| 4,268,679 A | 5/1981 | Lavanish |
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Watari et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |

(56) References Cited

U.S. PATENT DOCUMENTS

| | | |
|---|---|---|
| 8,338,332 B1 | 12/2012 | Hacker et al. |
| 8,340,862 B2 | 12/2012 | Baumgarten et al. |
| 8,407,157 B2 | 3/2013 | Anderson |
| 8,428,829 B2 | 4/2013 | Brunnert et al. |
| 8,478,493 B2 | 7/2013 | Anderson |
| 8,488,865 B2 | 7/2013 | Hausmann et al. |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow |
| 8,738,244 B2 | 5/2014 | Lenz |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,179,599 B2 | 11/2015 | Bischoff |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,856,612 B2 | 1/2018 | Oetken |
| 9,861,040 B2 | 1/2018 | Bonefas |
| 9,872,433 B2 | 1/2018 | Acheson et al. |
| 9,903,077 B2 | 2/2018 | Rio |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,126,153 B2 | 11/2018 | Bischoff et al. |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow |
| 10,255,670 B1 | 4/2019 | Wu et al. |
| 10,275,550 B2 | 4/2019 | Lee |
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |

(56) References Cited

U.S. PATENT DOCUMENTS

| | | |
|---|---|---|
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,477,756 B1 | 11/2019 | Richt et al. |
| 10,485,178 B2 | 11/2019 | Mayerle |
| 10,521,526 B2 | 12/2019 | Haaland et al. |
| 10,537,061 B2 | 1/2020 | Farley et al. |
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |
| 11,079,725 B2 * | 8/2021 | Palla ............... A01D 41/141 |
| 11,650,553 B2 * | 5/2023 | Palla ............... A01D 41/141 700/44 |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert et al. |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer |
| 2012/0087771 A1 | 4/2012 | Wenzel |
| 2012/0096827 A1 | 4/2012 | Chaney et al. |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |

(56) References Cited

U.S. PATENT DOCUMENTS

| | | |
|---|---|---|
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Hellgen et al. |
| 2013/0124239 A1 | 5/2013 | Rosa et al. |
| 2013/0184944 A1 | 7/2013 | Missotten et al. |
| 2013/0197767 A1 | 8/2013 | Lenz |
| 2013/0205733 A1 | 8/2013 | Peters et al. |
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner et al. |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0084813 A1 | 3/2016 | Anderson et al. |
| 2016/0088794 A1 | 3/2016 | Baumgarten et al. |
| 2016/0106038 A1 | 4/2016 | Boyd et al. |
| 2016/0146611 A1 | 5/2016 | Matthews |
| 2016/0202227 A1 | 7/2016 | Mathur et al. |
| 2016/0203657 A1 | 7/2016 | Bell et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1* | 11/2016 | Acheson ............ A01D 41/127 |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |

(56) References Cited

U.S. PATENT DOCUMENTS

| | | |
|---|---|---|
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0332767 A1 | 11/2018 | Muench et al. |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Crnkovic et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0125098 A1* | 4/2020 | Cavender-Bares ........................ G05D 1/0088 |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeler et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer Zu Helligen |
| 2020/0196526 A1 | 6/2020 | Koch et al. |
| 2020/0202596 A1 | 6/2020 | Kitahara et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0265527 A1 | 8/2020 | Rose et al. |
| 2020/0278680 A1 | 9/2020 | Schultz et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0129853 A1 | 5/2021 | Appleton et al. |
| 2021/0176916 A1 | 6/2021 | Sidon et al. |
| 2021/0176918 A1 | 6/2021 | Franzen et al. |
| 2021/0289687 A1 | 9/2021 | Heinold et al. |
| 2021/0321567 A1 | 10/2021 | Sidon et al. |

FOREIGN PATENT DOCUMENTS

| | | |
|---|---|---|
| BR | MU6800140 U | 9/1989 |
| BR | PI0502658 A | 2/2007 |
| BR | PI0802384 A2 | 3/2010 |
| BR | PI1100258 A2 | 3/2014 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 101236188 A | 8/2008 |
| CN | 100416590 C | 9/2008 |

(56) References Cited

FOREIGN PATENT DOCUMENTS

| | | | |
|---|---|---|---|
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |
| CN | 102277867 B | 12/2011 |
| CN | 202110103 U | 1/2012 |
| CN | 202119772 U | 1/2012 |
| CN | 202340435 U | 7/2012 |
| CN | 103088807 A | 5/2013 |
| CN | 103181263 A | 7/2013 |
| CN | 203053961 U | 7/2013 |
| CN | 203055121 U | 7/2013 |
| CN | 203206739 U | 9/2013 |
| CN | 102277867 B | 10/2013 |
| CN | 203275401 U | 11/2013 |
| CN | 203613525 U | 5/2014 |
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109357804 A | 2/2019 |
| CN | 109485353 A | 3/2019 |
| CN | 109633127 A | 4/2019 |
| CN | 109763476 A | 5/2019 |
| CN | 109961024 A | 7/2019 |
| CN | 110262287 A | 9/2019 |
| CN | 110720302 A | 1/2020 |
| CN | 111201879 A | 5/2020 |
| CN | 210585958 U | 5/2020 |
| CN | 111406505 A | 7/2020 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 441597 C | 3/1927 |
| DE | 504035 C | 7/1930 |
| DE | 2354828 A1 | 5/1975 |
| DE | 152380 A1 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013019098 B3 | 1/2015 |
| DE | 102014108449 A1 | 2/2015 |
| DE | 2014201203 A1 | 7/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017204511 A1 | 9/2018 |
| DE | 102019206734 A1 | 11/2020 |
| DE | 102019114872 A1 | 12/2020 |
| EP | 0070219 B1 | 10/1984 |
| EP | 0355049 A2 | 2/1990 |
| EP | 845198 B2 | 6/1998 |
| EP | 0532146 B1 | 8/1998 |
| EP | 1444879 A1 | 8/2004 |
| EP | 1219159 B1 | 6/2005 |
| EP | 1219153 B1 | 2/2006 |
| EP | 1692928 A2 | 8/2006 |
| EP | 1574122 81 | 2/2008 |
| EP | 1943877 A2 | 7/2008 |
| EP | 1598586 B1 | 9/2009 |
| EP | 1731983 B1 | 9/2009 |
| EP | 2146307 A2 | 1/2010 |
| EP | 0845198 B2 | 2/2010 |
| EP | 2186389 A1 | 5/2010 |
| EP | 2267566 A2 | 12/2010 |
| EP | 3491192 A2 | 12/2010 |
| EP | 2057884 B1 | 1/2011 |
| EP | 2146307 B1 | 5/2012 |
| EP | 2446732 A1 | 5/2012 |
| EP | 2524586 A2 | 11/2012 |
| EP | 2529610 A1 | 12/2012 |
| EP | 2243353 B1 | 3/2013 |
| EP | 2174537 B1 | 5/2013 |
| EP | 2592919 A1 | 5/2013 |
| EP | 1674324 B2 | 5/2014 |
| EP | 2759829 A1 | 7/2014 |
| EP | 2764764 B1 | 8/2014 |
| EP | 2267566 A3 | 12/2014 |
| EP | 2191439 B1 | 3/2015 |
| EP | 2586286 B1 | 3/2015 |
| EP | 2592919 B1 | 9/2015 |
| EP | 2921042 A1 | 9/2015 |
| EP | 2944725 A1 | 11/2015 |
| EP | 2764764 81 | 12/2015 |
| EP | 2510777 B1 | 3/2016 |
| EP | 2997805 A1 | 3/2016 |
| EP | 3000302 A1 | 3/2016 |
| EP | 2868806 B1 | 7/2016 |
| EP | 3085221 A1 | 10/2016 |
| EP | 3095310 A1 | 11/2016 |
| EP | 3097759 A1 | 11/2016 |
| EP | 2452551 B1 | 5/2017 |

(56) References Cited

FOREIGN PATENT DOCUMENTS

| | | |
|---|---|---|
| EP | 2017077113 A1 | 5/2017 |
| EP | 3175691 A1 | 6/2017 |
| EP | 2017096489 A1 | 6/2017 |
| EP | 3195719 A1 | 7/2017 |
| EP | 3195720 A1 | 7/2017 |
| EP | 3259976 A1 | 12/2017 |
| EP | 3262934 A1 | 1/2018 |
| EP | 3491192 A1 | 1/2018 |
| EP | 3287007 A1 | 2/2018 |
| EP | 3298876 A1 | 3/2018 |
| EP | 3300579 A1 | 4/2018 |
| EP | 3315005 A1 | 5/2018 |
| EP | 3316208 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 2997805 A1 | 10/2018 |
| EP | 3384754 A1 | 10/2018 |
| EP | 2019034213 A1 | 2/2019 |
| EP | 3289853 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3491192 A1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| IN | 1632DE2014 A | 8/2016 |
| IN | 01632DE2014 A | 8/2016 |
| IN | 201641027017 A | 10/2016 |
| IN | 202041039250 A | 9/2020 |
| JP | 7079681 A | 11/1982 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 A | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | GT06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2447640 C1 | 4/2012 |
| RU | 2502047 C | 12/2013 |
| RU | 2502047 C1 | 12/2013 |
| RU | 164128 | 8/2016 |
| RU | 2017114139 A | 4/2017 |
| RU | 2017114139 A | 10/2018 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A | 1/1985 |
| SU | 1526588 A1 | 12/1989 |
| SU | 1540053 A1 | 1/1991 |
| SU | 1761864 A1 | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |

(56) References Cited

FOREIGN PATENT DOCUMENTS

| | | | |
|---|---|---|---|
| WO | 2017116913 | A1 | 7/2017 |
| WO | 2017170507 | A1 | 10/2017 |
| WO | 2017205406 | A1 | 11/2017 |
| WO | 2017205410 | A1 | 11/2017 |
| WO | 2018043336 | A1 | 3/2018 |
| WO | 2018073060 | A1 | 4/2018 |
| WO | 2018081759 | A1 | 5/2018 |
| WO | 2018112615 | | 6/2018 |
| WO | 2018116772 | A1 | 6/2018 |
| WO | 2018142768 | A1 | 8/2018 |
| WO | 2018200870 | A1 | 11/2018 |
| WO | 2018206587 | A1 | 11/2018 |
| WO | 2018220159 | A1 | 12/2018 |
| WO | 2018226139 | A1 | 12/2018 |
| WO | 2018235486 | A1 | 12/2018 |
| WO | 2018235942 | A1 | 12/2018 |
| WO | WO18235486 | A1 | 12/2018 |
| WO | 2019079205 | A1 | 4/2019 |
| WO | 2019081349 | A1 | 5/2019 |
| WO | 2019091535 | A1 | 5/2019 |
| WO | 2019109191 | A1 | 6/2019 |
| WO | 2019124174 | A1 | 6/2019 |
| WO | 2019124217 | A1 | 6/2019 |
| WO | 2019124225 | A1 | 6/2019 |
| WO | 2019124273 | A1 | 6/2019 |
| WO | 2019129333 | A1 | 7/2019 |
| WO | 2019129334 | A1 | 7/2019 |
| WO | 2019129335 | A1 | 7/2019 |
| WO | 2019215185 | A1 | 11/2019 |
| WO | 2019230358 | A1 | 12/2019 |
| WO | 2020026578 | A1 | 2/2020 |
| WO | 2020026650 | A1 | 2/2020 |
| WO | 2020026651 | A1 | 2/2020 |
| WO | 2020031473 | A1 | 2/2020 |
| WO | 2020038810 | A1 | 2/2020 |
| WO | 2020039312 | A1 | 2/2020 |
| WO | 2020039671 | A1 | 2/2020 |
| WO | 2020044726 | A1 | 3/2020 |
| WO | 2020082182 | A1 | 4/2020 |
| WO | 2020100810 | A1 | 5/2020 |
| WO | 2020110920 | A1 | 6/2020 |
| WO | 2020195007 | A1 | 10/2020 |
| WO | 2020206941 | A1 | 10/2020 |
| WO | 2020206942 | A1 | 10/2020 |
| WO | 2020210607 | A1 | 10/2020 |
| WO | 2020221981 | A1 | 11/2020 |

OTHER PUBLICATIONS

Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assolcated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding com hybrid characteristics and properties can impact your seed decisions", 8 pages, Sep. 21, 2018.

TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Com Agronomy, Originally written Feb. 1, 2006 | Last updated Oct. 18, 2018, 2 pages.
University of Nebraska—Lincoln, "Combine Adjustments for Downed Corn—Crop Watch", Oct. 27, 2017, 5 pages.
"Combine Cleaning: Quick Guide To Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Depredation by Wildlife, Jun. 2006, 14 pages.
Martinez-Feria et al., Iowa State University, "Com Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does An Adaptive Gearbox Really Learn How You Drive?", Oct. 30, 2019, 8 pages.
Eggert, "Optimization of Combine Processes Using Expert Knowledge and Methods of Artificial Intelligence". Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture" Yield Monitors University of Missouri—System, 4 pages, 1998.
Apan et al., "Predicting Grain Protein Content in Wheat Using Hyperspectral Sensing of In-season Crop Canopies and Partial Least Squares Regression" 18 pages, 2006.

(56) References Cited

OTHER PUBLICATIONS

Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Chinese Office Action issued in application No. 202010189019.0 dated May 9, 2023 (08 pages), which is a foreign counterpart to the present application.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Bhattarai et al., "Remote Sensing Data to Detect Hessian Fly Infestation in Commercial Wheat Fields", Apr. 16, 2019, 8 pages. (Duplicate reference, same as NPL 3).
Martinez-Feria et al., "Evaluating Maize and Soybean Grain Dry-Down in the Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Ma et al., Identification of Fusarium Head Blight in Winter Wheat Ears Using Continuous Wavelet Analysis, Dec. 19, 2019, 15 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "VIDEO: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
Application and Drawings for U.S. Appl. No. 16/171,978, filed Oct. 26, 2018, 53 pages.

(56) References Cited

OTHER PUBLICATIONS

Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., May 2014. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Application and Drawings for U.S. Appl. No. 17/067,383, filed Oct. 9, 2020, 61 pages.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells ,N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings filed Oct. 9, 2020, 63 pages.
U.S. Appl. No. 17/066,442 Application and Drawings filed Oct. 8, 2020, 65 pages.
U.S. Appl. No. 16/380,550, filed Apr. 10, 2019, Application and Drawings, 47 pages.
U.S. Appl. No. 17/066,999 Application and Drawings filed Oct. 9, 2020, 67 pages.
U.S. Appl. No. 17/066,444 Application and Drawings filed Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.
Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings filed Apr. 10, 2019, 55 pages.
S. Veenadhari et al., "Machine Learning Approach for Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings filed Apr. 10, 2019, 46 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High- Resolution Uavimages in Gronau, Germany", Feb. 2017, 63 pages.
Hunt, "Mapping Weed Infestations Using Remote Sensing", 8 pages Jul. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 Jun. 2016.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th Inter-

(56) References Cited

OTHER PUBLICATIONS national Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages.
"Notice of Retraction Virtual simulation of plant with individual stem based on crop growth model", Mar. 5, 2017, 7 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jamevich et al., Forecasting Weed Distributions Using Climate Data: A GIS Early Warning Tool, Downloaded on Jul. 13, 2020, 12 pages.
Combine Cutting and Feeding Mechanisms in the Southeast, By J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) By Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.

Martin et al. Breakage Susceptibiltiy and Hardness of Corn Kernels of Various Sizes and Shapes, vol. 30: May 1087, 10 pages. https://pdfs.semanticscholar.org/e579/1b5363b6a78efd44adfb97755a0cdd14f7ca.pdf.
Hoff, "Combine Adjustments" (https://smallfarmersjournal.com/combine-adjustments!), Mar. 1943, 9 pages.
Optimizing Crop Profit Across Multiple Grain Attributes and Stover, Electronic Publication Date May 26, 2009, 17 pages.
Unglesbee, Soybean Pod Shatter—Bad Enough to Scout Before Harvest—DTN, Oct. 17, 2018, 11 pages. Susceptibility to shatter (https://agfax.com/2018/10/17/soybean-pod-shatter-bad-enough-to-scout-before-harvest-dtn/).
GIS Maps for Agricultural, accessed on May 10, 2022, 7 pages. https://www.satimagingcorp.com/services/geographic-information-systems/gis-maps-agriculture-mapping.
https://wingtra.com/drone-mapping-applications/use-of-drones-in-agriculture, accessed on May 10, 2022, 19 pages.
Energy Requirement Model for a Combine Harvester: Part 1: Development of Component Models, Published online Dec. 22, 2004, 17 pages.
Energy Requirement Model for a Combine Harvester, Part 2: Integration of Component Models, Published online Jan. 18, 2005, 11 pages.
Pioneer on reducing soybean harvest losses including combine adjustments (last accessed Jul. 23, 2020) (https://www.pioneer.com/us/agronomy/reducing_harvest_losses_in_soybeans.html), 5 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, VIDEO: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGl4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component Models, Abstract Only, Jan. 2005.
http://canola.okstate.edu/cropproduction/harvesting, 8 pages, Aug. 2011.

(56) References Cited

OTHER PUBLICATIONS

"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.
Pioneer Estimator, "Corn Yield Estimator" accessed on Feb. 13, 2018, 1 page. retrieved from: https://www.pioneer.com/home/site/US/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.lastate.edu/blog/bob-hartzler/harvest-weed-seed-control.
Getting Rid of WeedsThrough Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.

\* cited by examiner

MACHINE CONTROL USING REAL-TIME MODEL

CROSS-REFERENCE TO RELATED APPLICATIONS

The present application is a continuation of and claims priority of U.S. patent application Ser. No. 17/344,517, filed Jun. 10, 2021, which is a continuation of U.S. patent application Ser. No. 16/380,531, filed Apr. 10, 2019, the contents of which are hereby incorporated by reference in their entirety.

FIELD OF THE DESCRIPTION

The present description relates to work machines. More specifically, the present description relates to a control system that dynamically, during runtime, senses data and generates and qualifies a predictive model and controls the work machine using that model.

BACKGROUND

There are a wide variety of different types of work machines. Those machines can include construction machines, turf management machines, forestry machines, agricultural machines, etc.

Some current systems have attempted to use a priori data to generate a predictive model that can be used to control the work machine. For instance, agricultural harvesters can include combine harvesters, forage harvesters, cotton harvesters, among other things. Some current systems have attempted to use a priori data (such as aerial imagery of a field) in order to generate a predictive yield map. The predicative yield map predicts yields at different geographic locations in the field being harvested. The current systems have attempted to use that predictive yield map in controlling the harvester.

The discussion above is merely provided for general background information and is not intended to be used as an aid in determining the scope of the claimed subject matter.

SUMMARY

A priori geo-referenced vegetative index data is obtained for a worksite, along with field data that is collected by a sensor on a work machine that is performing an operation at the worksite. A predictive model is generated, while the machine is performing the operation, based on the geo-referenced vegetative index data and the field data. A model quality metric is generated for the predictive model and is used to determine whether the predictive model is a qualified predicative model. If so, a control system controls a subsystem of the work machine, using the qualified predictive model, and a position of the work machine, to perform the operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
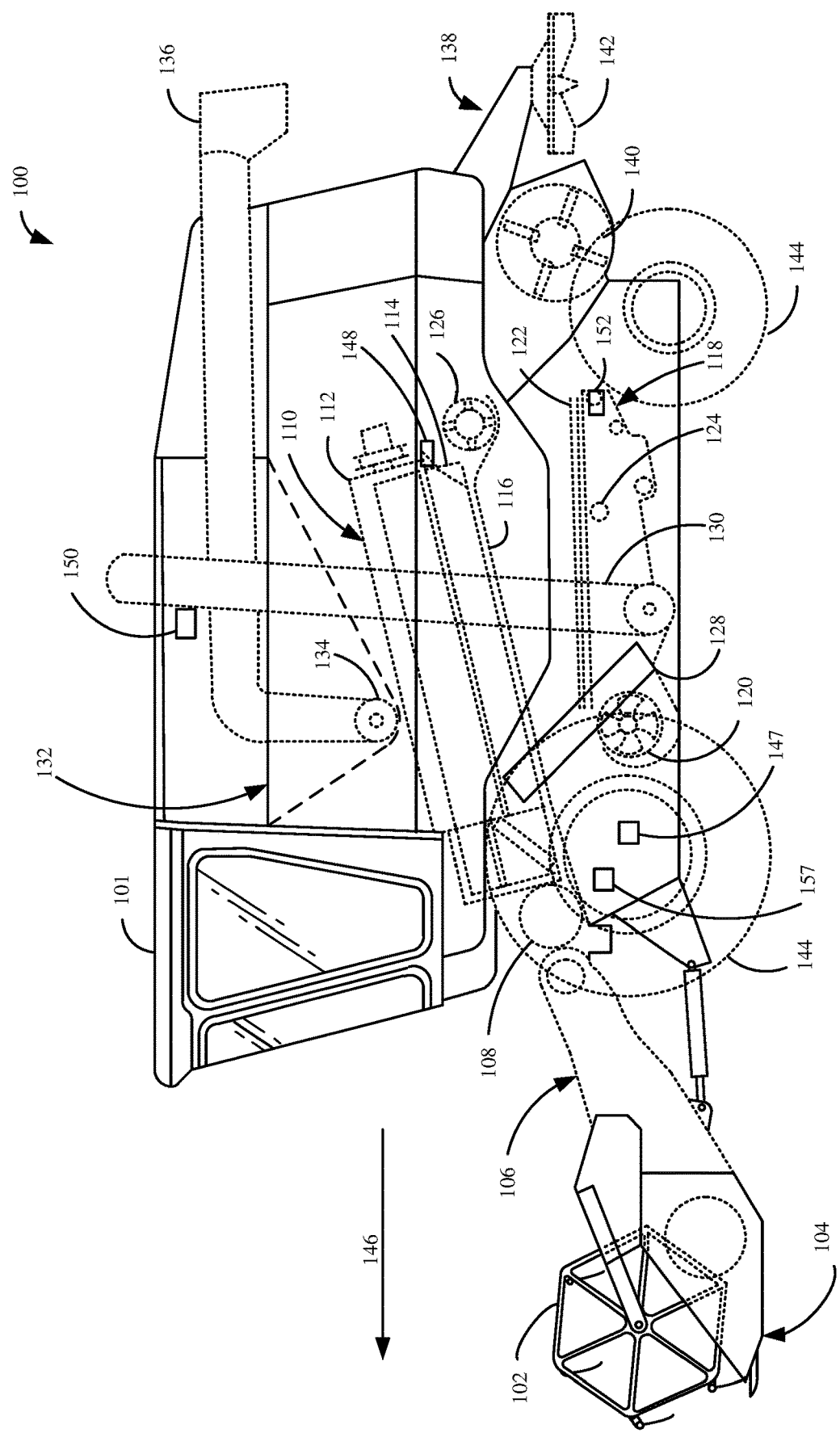
FIG. 1 is a partial schematic, partial pictorial illustration of a combine harvester.

As discussed above, some current systems attempt to use a priori data (such as aerial images) in order to generate a predictive map that can be used to control a work machine. By way of example, there has been a great deal of work done in attempting to generate a predictive yield map for a field, based upon vegetation index values generated from aerial imagery. Such predictive yield maps attempt to predict a yield at different locations within the field. The systems attempt to control a combine harvester (or other harvester) based upon the predicted yield.

Also, some systems attempt to use forward looking perception systems, which can involve obtaining optical images of the field, forward of a harvester in the direction of travel. A yield can be predicted for the area just forward of the harvester, based upon those images. This is another source of a priori data that can be used to generate a form of a predictive yield map.

All of these types of systems can present difficulties.

For instance, none of the models generated based on a priori data represent actual, ground truth data. For instance, they only represent predictive yield, and not actual ground truthed yield values. Therefore, some systems have attempted to generate multiple different models, and then assign them a quality score based upon historic performance. For instance, a remote server environment can obtain a priori aerial image data and generate a predictive yield map. The remote server environment can then receive actual yield data generated when that field was harvested. It can determine the quality or accuracy of the model, based upon the actual yield data. The predictive yield model, or the algorithm used to create the model, can then be modified to improve it.

However, this does not help in controlling the harvester, during the harvesting operation. Instead, the actual yield data is provided to the remote server environment, after the harvesting operation is completed, so that the model can be improved for the next harvesting season, for that field.

In contrast, the following description describes a system and method for generating a predictive model based not only on a priori data, but based upon in situ, field data that represents actual values being modeled. For instance, where the predictive map is a predictive yield map, the model used to generate that map is dynamically generated based upon a priori data (such as aerial imagery data) and in situ data, such as actual yield data sensed on the harvester during the harvesting operation. Once the predictive yield map is generated, the model (e.g., the predictive map) used to generate it is evaluated to determine its accuracy (or quality). If the quality of the model is sufficient, it is used for controlling the combine, during the harvesting operation, and it is dynamically, and iteratively, evaluated using in situ data, collected from the combine during the harvesting operation. If the model does not have a high enough quality, then the system can dynamically switch to an alternate model, or it can switch back to manual operation or preset values, or it can generate and evaluate other alternative models.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axel, or other components. The travel speed and position of combine 100 can also be sensed by a positioning system 157, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation or pose of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

Figure 2:
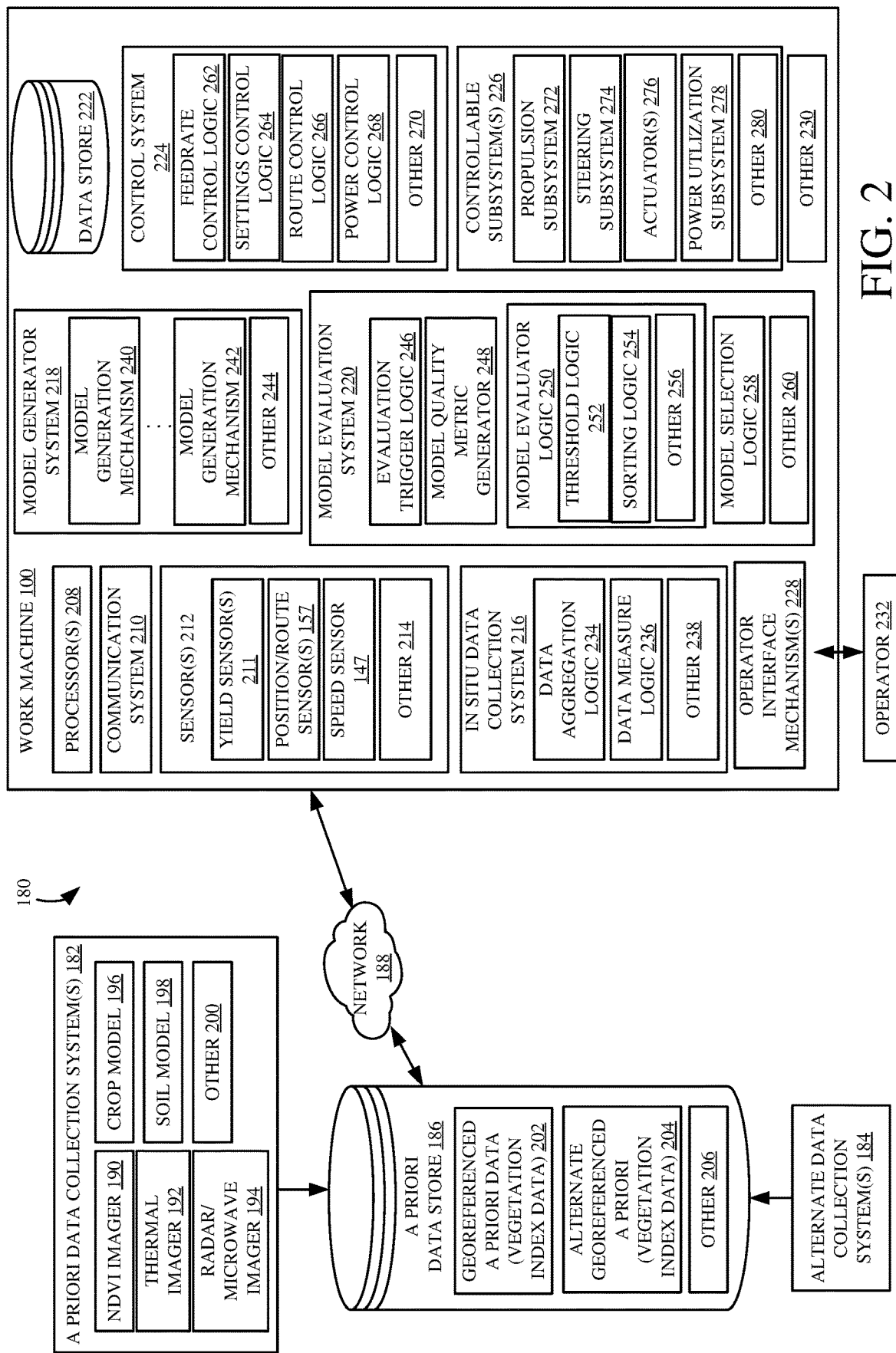
FIG. 2 is a block diagram showing one example of a computing system architecture that includes the combine harvester shown in FIG. 1.

FIG. 2 is a block diagram showing one example of a computing system architecture 180 that includes work machine 100, a priori data collection systems 182, alternate data collection systems 184, and a priori data store 186 which is connected to work machine 100 by network 188. Some items shown in FIG. 2 are similar to those shown in FIG. 1, and they are similarly numbered.

Network 188 can be any of a wide variety of different types of networks. For instance, it can be a wide area network, a local area network, a near field communication network, a cellular communication network, or any of a wide variety of other networks, or combinations of networks.

A priori data collection systems 182 illustratively collect a priori data that can be used by work machine 100 to generate a model (such as a predictive map) that can be used to control work machine 100. Thus, in one example, systems 182 can include normalized difference vegetation index imager 190, thermal imager 192, radar/microwave imager 194, crop model data 196, soil model data 198, and it can include a wide variety of other items 200. NDVI imager 190 can include such things as aerial imaging systems (e.g., satellite systems, manned or unmanned aerial vehicle imaging systems, etc.) that can be used to take images from which NDVI values can be generated. Thermal imager 192 illustratively includes one or more thermal imaging sensors that generate thermal data. Radar/microwave imager 194 illustratively generates radar or microwave images. A crop model 196 can be used to generate data which is predictive of certain characteristics of the crop, such as yield, moisture, etc. Soil model 198 is illustratively a predictive model that generates characteristics of soil at different locations in a field. Such characteristics can include soil moisture, soil compaction, soil quality or content, etc.

All of these systems 182 can be used to generate data directly indicative of metric values, or from which metric values can be derived, and used in controlling work machine 100. They can be deployed on remote sensing systems, such as unmanned aerial vehicles, manned aircraft, satellites, etc. The data generated by systems 182 can include a wide variety of other things as well, such as weather data, soil type data, topographic data, human-generated maps based on historical information, and a wide variety of other systems for generating data corresponding to the worksite on which work machine 100 is currently deployed.

Alternate data collection systems 184 may be similar to systems 182, or different. Where they are the same or similar, they may collect the same types of data, but at different times during the growing season. For instance, some aerial imagery generated during a first time in the growing season may be more helpful that other aerial imagery that was captured later in the growing season. This is just one example.

Alternate data collection systems 184 can include different collection systems as well, that generate different types of data about the field where work machine 100 is deployed. In addition, alternate data collection systems 184 can be similar to systems 182, but they can be configured to collect data at a different resolution (such as at a higher resolution, a lower resolution, etc.). They can also be configured to capture the same type of data using a different collection mechanism or data capturing mechanism which may be more or less accurate under different criteria.

A priori data store 186 thus includes geo-referenced a priori data 202 as well as alternate geo-referenced a priori data 204. It can include other items 206 as well. Data 202 may be, for example, vegetation index data which includes vegetation index values that are geo-referenced to the field being harvested. The vegetation index data may include such things as NDVI data, leaf area index data, soil adjusted vegetation index (SAVI) data, modified or optimized SAVI data, simple ratio or modified simple ratio data, renormalized difference vegetation index data, chlorophyll/pigment related indices (CARI), modified or transformed CARI, triangular vegetation index data, structural insensitive pigment index data, normalized pigment chlorophyll index data, photochemical reflectance index data, red edge indices, derivative analysis indices, among a wide variety of others.

FIG. 2 also shows that work machine 100 can include one or more different processors 208, communication system 210, sensors 212 (which can include yield sensors 211, position/route sensors 157, speed sensors 147, and a wide variety of other sensors 214 (which can be those described above with respect to FIG. 1 or different ones)), in situ data collection system 216, model generator system 218, model evaluation system 220, data store 222, control system 224, controllable subsystems 226, operator interface mechanisms 228, and it can include a wide variety of other items 230.

FIG. 2 shows that operator 232 can interact with operator interface mechanisms 228 in order to control and manipulate machine 100. Thus, operator interface mechanisms 228 can include such things as a steering wheel, pedals, levers, joysticks, buttons, dials, linkages, etc. In addition, they can include a display device that displays user actuatable elements, such as icons, links, buttons, etc. Where the display is a touch sensitive display, those user actuatable items can be actuated by touch gestures. Similarly, where mechanisms 228 include speech processing mechanisms, then operator 232 can provide inputs and receive outputs through a microphone and speaker, respectively. Operator interface mechanisms 228 can include any of a wide variety of other audio, visual or haptic mechanisms.

In situ data collection system 216 illustratively includes data aggregation logic 234, data measure logic 236, and it can include other items 238. Model generator system 218 illustratively includes a set of different model generation mechanisms 240-242 that may use different schemes to generate predictive models that can be used in controlling machine 100. For example, they may generate predictive models using a linear function, different functions, such as a curve, or they may be used to generate different types of predictive models, such as a neural network, a Bayesian model, etc. System 218 can include other items 244 as well.

Model evaluation system 220 illustratively receives one or more predictive models generated by model generator system 218 and evaluates the accuracy of that model. Thus, it includes model evaluation trigger 246, model quality metric generator 248, model evaluator logic 250 (which, itself, includes threshold logic 252, sorting logic 254, and other items 256), model selection logic 258, and it can include other items 260.

Evaluation trigger logic 246 detects an evaluation trigger which indicates that model evaluation system 220 is to evaluate the accuracy of one or more predictive models. Those models may be currently in use in controlling work machine 100, or they may be different models that are generated, as alternative models which may be used to replace the current model, if the alternate model is more accurate. Once triggered, model quality metric generator 248 illustratively generates a model quality metric for a model under analysis. An example may be helpful.

Assume that the predictive model generated by system 218 is a predictive yield model that predicts a yield at different locations in the field being harvested. Evaluation trigger logic 246 will be triggered based on any of a variety of different types of criteria (some of which are described below) so that model evaluation system 220 iteratively, and dynamically evaluates the accuracy of the predictive yield model, during the harvesting operation. In that case, model quality metric generator 248 will obtain actual yield data from yield sensors 211 and determine the accuracy of the predictive yield model that it is evaluating. Based on that accuracy, it generates an accuracy score or quality score. It can do this for one or more different models.

Model evaluator logic 250 then determines whether the model is qualified to be used in order to control machine 100. It can do this in a number of different ways. Threshold logic 252 can compare the model quality metric generated by generator 248 to a threshold to determine whether the model is performing (or will perform) adequately. Where multiple models are being evaluated simultaneously, sorting logic 254 can sort those models based upon the model quality metric generated for each of them. It can find the best performing model (for which the model quality metric is highest) and threshold logic 252 can then determine whether the model quality metric for that model meets the threshold value.

Model selection logic 258 then selects a model, where one is performing (or will perform) adequately based on the model quality metric and its evaluation. It provides the selected predictive model to control system 224 which uses that model to control one or more of the different controllable subsystems 226.

Thus, control system 224 can include feed rate control logic 262, settings control logic 264, route control logic 266, power control logic 268, and it can include other items 270. Controllable subsystems 226 can include sensors 212, propulsion subsystem 272, steering subsystem 274, one or more different actuators 276 that may be used to change machine settings, machine configuration, etc., power utilization subsystem 278, and it can include a wide variety of other systems 280, some of which were described above with respect to FIG. 1.

Feed rate control logic 262 illustratively controls propulsion system 272 and/or any other controllable subsystems 226 to maintain a relatively constant feed rate, based upon the yield for the geographic location that harvester 100 is about to encounter, or other characteristic predicted by the predictive model. By way of example, if the predictive model indicates that the predicted yield in front of the combine (in the direction of travel) is going to be reduced, then feed rate control logic 262 can control propulsion system 272 to increase the forward speed of work machine 100 in order to maintain the feed rate relatively constant. On the other hand, if the predictive model indicates that the yield ahead of work machine 100 is going to be relatively high, then feed rate control logic 262 can control propulsion system 272 to slow down in order to, again, maintain the feed rate at a relatively constant level.

Similarly, settings control logic 264 can control actuators 276 in order to change machine settings based upon the predicted characteristic of the field being harvested (e.g., based upon the predicted yield, or other predicted characteristic). By way of example, settings control logic 264 may actuate actuators 276 that change the concave clearance on a combine, based upon the predicted yield or biomass to be encountered by the harvester.

Route control logic 266 can control steering subsystem 274, also based upon the predictive model. By way of example, operator 232 may have perceived that a thunderstorm is approaching, and provided an input through operator interface mechanisms 228 indicating that operator 232 wishes the field to be harvested in a minimum amount of time. In that case, the predictive yield model may identify areas of relatively high yield and route control logic 266 can control steering subsystem 274 to preferentially harvest those areas first so that a majority of the yield can be obtained from the field prior to the arrival of the thunderstorm. This is just one example. In another example, it may be that the predictive model is predicting a soil characteristic (such as soil moisture, the presence of mud, etc.) that may affect traction. Route control logic 266 can control steering subsystems 274 to change the route or direction of work machine 100 based upon the predicted traction at different routes through the field.

Power control logic 268 can generate control signals to control power utilization subsystem 278 based upon the predicted value as well. For instance, it can allocate power to different subsystems, generally increase power utilization or decrease power utilization, etc., based upon the predictive model. These are just examples and a wide variety of other control signals can be used to control other controllable subsystems in different ways as well.

Figure 3A:
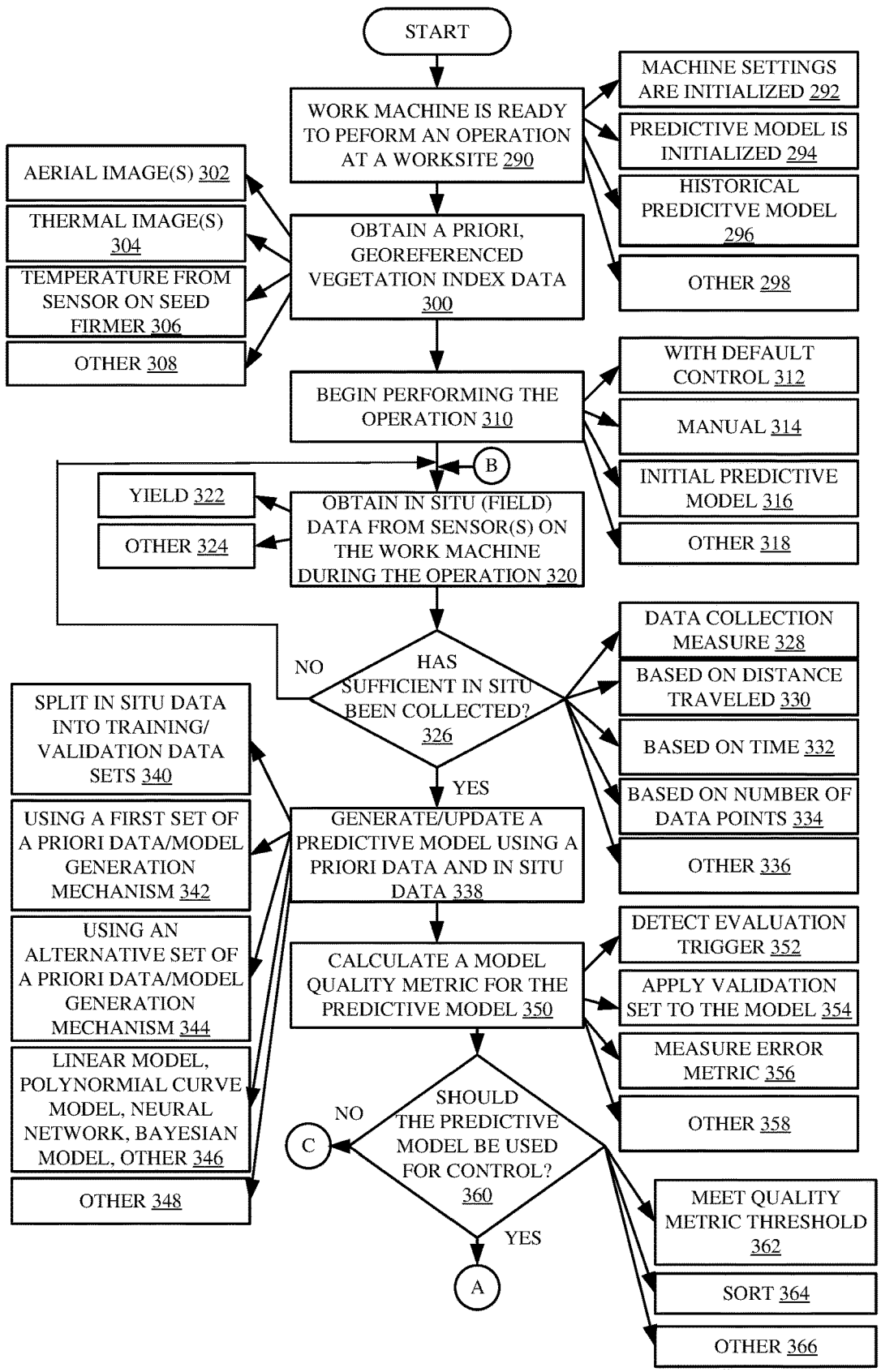
FIGS. 3A-3C (collectively referred to herein as FIG. 3) show a flow chart illustrating one example of the operation of the computing system architecture shown in FIG. 2.
Figure 3B:
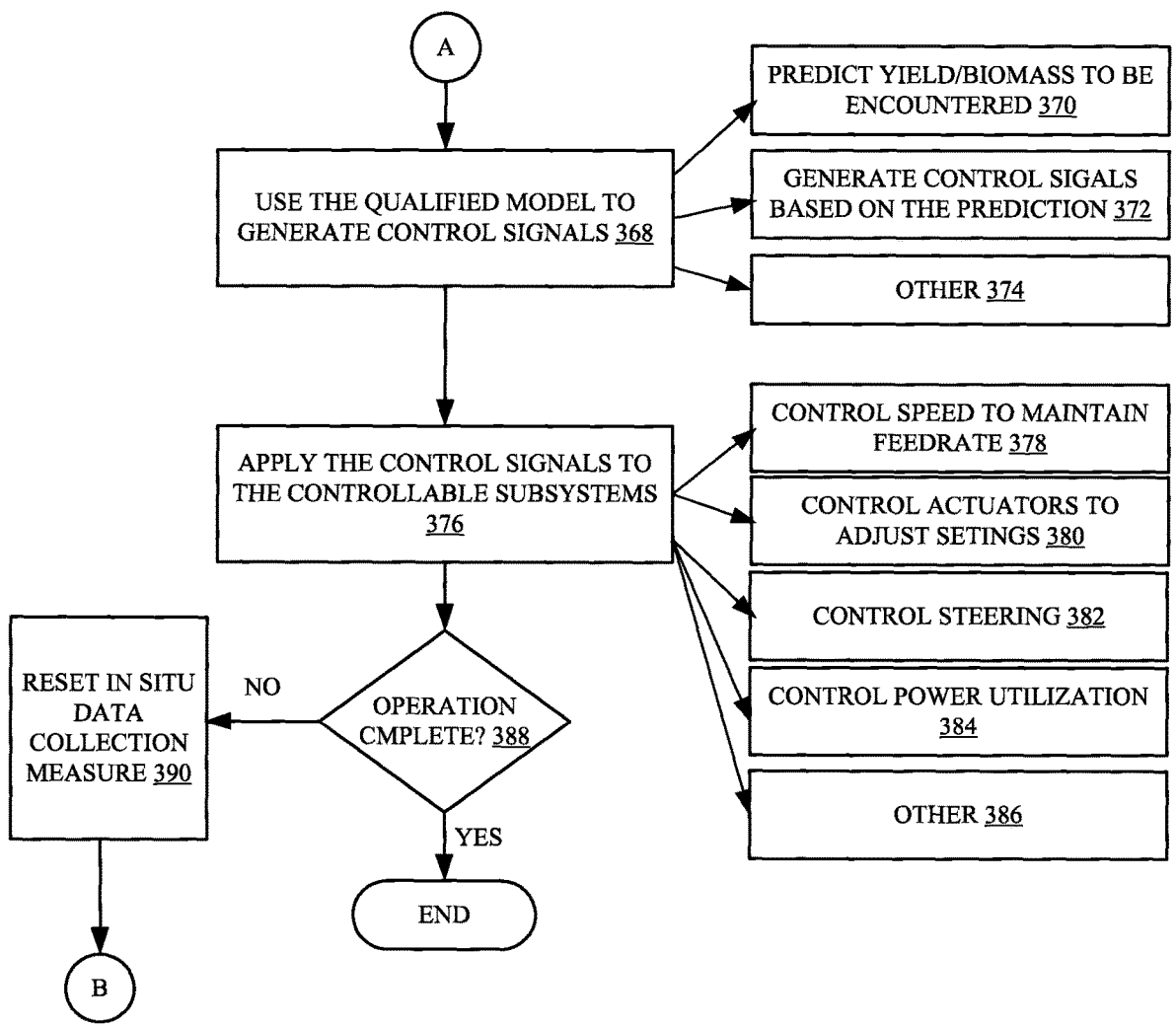
Figure 3C:
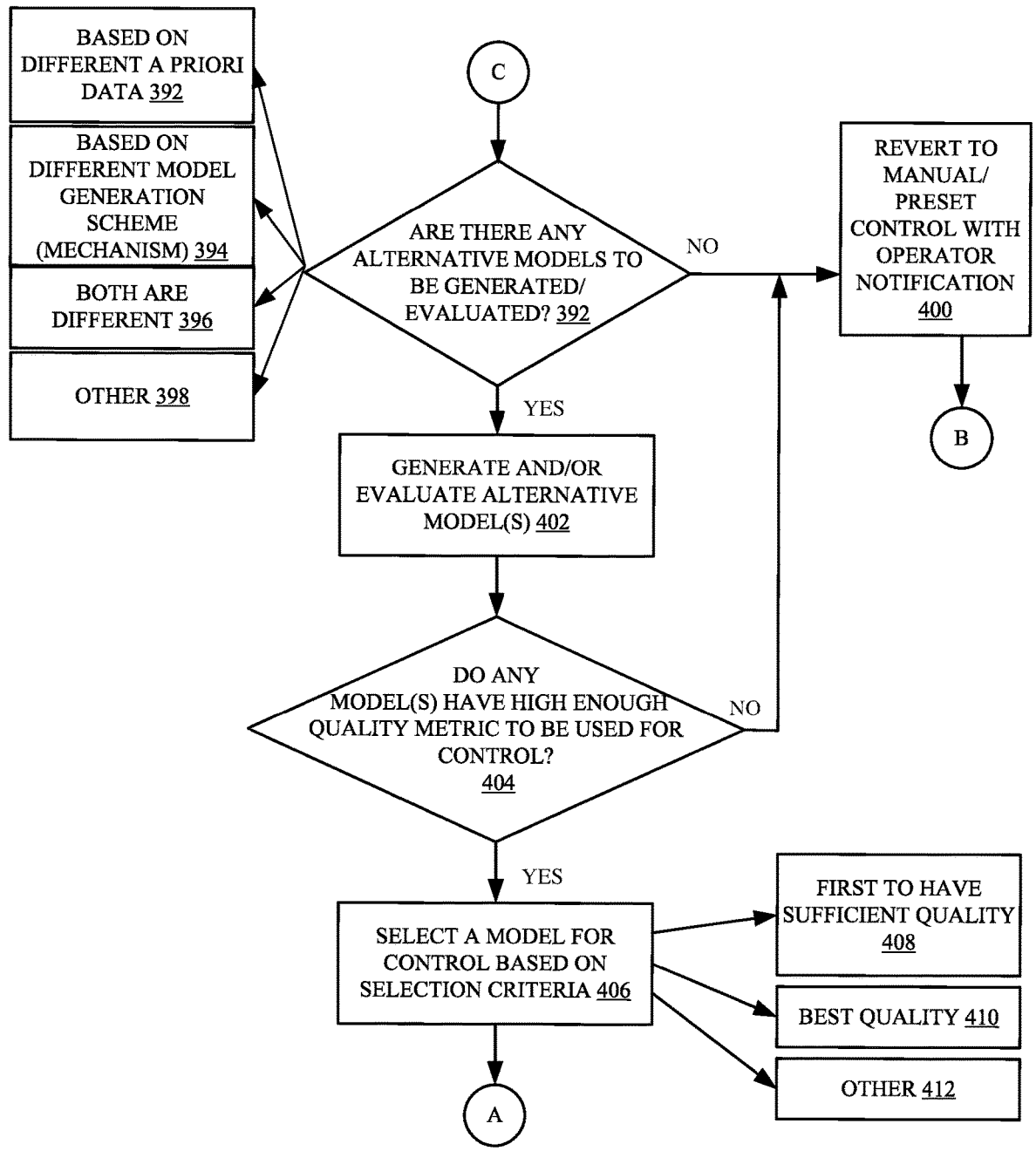

FIGS. 3A-3C (collectively referred to herein as FIG. 3) illustrate a flow diagram showing one example of the operation of architecture 180, shown in FIG. 2. It is first assumed that work machine 100 is ready to perform an operation at a worksite. This is indicated by block 290 in the flow diagram of FIG. 3. The machine can be configured with initial machine settings that can be provided by the operator or that can be default settings, for machine operation. This is indicated by block 292. A predictive model, that may be used for controlling work machine 100, may be initialized as well. In that case, the model parameters can be set to initial values or default values that are empirically determined or determined in other ways. Initializing the predictive model is indicated by block 294.

In another example, a predictive model can be used, during the initial operation of work machine 100 in the field, based upon historical use. By way of example, it may be that the last time this current field was harvested, with this crop type, a predictive model was used and stored. That model may be retrieved and used as the initial predictive model in controlling work machine 100. This is indicated by block 296. The work machine can be configured and initialized in a wide variety of other ways as well, and this is indicated by block 298.

Communication system 210 is illustratively a type of system that can be used to obtain a priori data over network 188 from a priori data store 186. It thus obtains a priori data which is illustratively geo-referenced vegetation index data for the field that is being harvested (or that is about to be harvested). Obtaining the a priori data is indicated by block 300. The a priori data, as discussed above with respect to FIG. 2, can be generated from a wide variety of different types of data sources, such as from aerial images 302, thermal images 304, temperature from a sensor on a seed firmer that was used to plant the field, as indicated by block 306, or a wide variety of other data sources 308.

Once the a priori data is obtained, it is provided to model generator system 218, and work machine 100 begins (or continues) to perform the operation (e.g., the harvesting operation). This is indicated by block 310. Again, control system 224 can begin to control controllable subsystems 226 with a default set of control parameters 312, under manual operation 314, using an initial predictive model (as discussed above) 316, or in other ways, as indicated by block 318.

As machine 100 is performing the operation (e.g., the harvesting operation) sensors 212 are illustratively generating in situ data (or field data) indicative of the various sensed variables, during the operation. Obtaining in situ (or field) data from sensors on work machine 100 during the operation is indicated by block 320 in the flow diagram of FIG. 3. In the example discussed herein, the in situ data can be actual yield data 322 generated from yield sensors 211. The yield sensors 211, as discussed above, may be mass flow sensors that sense the mass flow of grain entering the clean grain tank on machine 100. That mass flow can then be correlated to a geographic position in the field from which it was harvested, to obtain an actual yield value for that geographic position. Of course, depending upon the type of predictive model being generated, the in situ (or field) data can be any of a wide variety of other types of data 324 as well.

Before model generation system 218 can dynamically generate a predictive model (e.g., map) or before model evaluation system 220 can adequately evaluate the accuracy of a predictive model, sensors 212 must generate sufficient in situ field data to make the model generation and/or evaluation meaningful. Therefore, in one example, in situ data collection system 216 includes data aggregation logic 234 that aggregates the in situ data generated by, or based on, the output from sensors 212. Data measure logic 236 can track that data along various different criteria, to determine when the amount of in situ data is sufficient. This is indicated by block 326 in the flow diagram of FIG. 3. Until that happens, processing reverts to block 320 where machine 100 continues to perform the operation and data aggregation logic 234 continues to aggregate in situ (field) data based on the outputs from sensors 212 (and possibly other information as well). In one example, data measure logic 236 generates a data collection measure that may be indicative of an amount of in situ data that has been collected. This is indicated by block 328. By way of example, the particular type of predictive model that is being generated or evaluated may best be generated or evaluated after a certain amount of data has been generated. This may be indicated by the data collection measure 328.

Data measure logic 236 may measure the distance that machine 100 has traveled in the field, while performing the operation. This may be used to determine whether sufficient in situ (field) data has been aggregated, and it is indicated by block 330.

Data measure logic 236 may measure the amount of time that machine 100 is performing the operation, and this may give an indication as to whether sufficient in situ data has been obtained. This is indicated by block 332. Data measure logic 236 may quantify the number of data points that have been aggregated by data aggregation logic 234 to determine whether it is sufficient. This is indicated by block 334 in the flow diagram of FIG. 3. Determining whether sufficient in situ data has been collected can be determined in a wide variety of other ways as well, and this is indicated by block 336.

Once sufficient in situ data has been collected, it is provided to model generator system 218 (which has also received the a priori data). System 218 uses at least one of the model generation mechanisms 240-242 in order to generate a predictive model using the a priori data and the in situ data. This is indicated by block 338 in the flow diagram of FIG. 3. It will also be noted that, as discussed below, even after a predictive model has been generated and is being used to control work machine 100, it can be iteratively evaluated and updated (or refined) based upon the continued receipt of in situ data. Thus, at block 338, where a predictive model has already been generated, it can be dynamically and iteratively updated and improved.

In one example, the predictive model is generated by splitting the in situ data into training data and validation data sets. This is indicated by block 340. The training data, along with the a priori data can be supplied to a model generation mechanism (such as mechanism 240) to generate the predictive model. This is indicated by block 342. It will be noted that additional model generation mechanisms 242 can be used to generate alternate predictive models. Similarly, even the same model generation mechanism 240 that generated the predictive model under analysis can be used to generate alternate predictive models using a different set of a priori data. Using an alternate set of a priori data or an alternate model generation mechanism to generate alternate models is indicated by block 344.

The model generation mechanisms 240-242 can include a wide variety of different types of mechanisms, such as a linear model, polynomial curve model, neural network, Bayesian model, or other models. This is indicated by block 346. The predictive model can be generated and/or dynamically updated in a wide variety of other ways as well, and this is indicated by block 348.

Once a predictive model has been generated or updated, model evaluation system 220 evaluates that model by generating a model quality metric for the predictive model. This is indicated by block 350 in the flow diagram of FIG. 3. By way of example, evaluation trigger logic 246 can detect an evaluation trigger indicating that a model is to be evaluated. This is indicated by block 352. For example, evaluation system 220 may be triggered simply by the fact that model generator system 218 provides a predictive model to it for evaluation. In another example, a predictive model may already be in use in controlling work machine 100, but it is to be evaluated intermittently or periodically. In that case, if the interval for evaluation has passed, this may trigger evaluation trigger logic 246. In yet another example, it may be that a predictive model is currently being used to control work machine 100, but a number of different alternate models have also been generated and are now available for evaluation. In that case, the alternate models can be evaluated to determine whether they will perform better than the predictive model currently in use. This may be a trigger for evaluation trigger logic 246 as well. Model evaluation can be taking place continuously, during operation, as well.

In another example, the evaluation trigger can be detected, indicating that a predictive model is to be evaluated, based upon the presence of an aperiodic event. For instance, it may be that operator 232 provides an input indicating that the operator wishes to have an alternate model evaluated. Similarly, it may be that model generator system 218 receives new a priori data, or a new model generation mechanism. All of these or other events may trigger model evaluation system 220 to evaluate a predictive model. Similarly, even though the current predictive model may be operating sufficiently, an alternate model interval may be set at which available alternate models are evaluated to ensure that the model currently being used is the best one for controlling machine 100. Thus, when the alternate model evaluation interval has run, this may trigger the model evaluation logic to evaluate a new model as well.

In order to calculate a model quality metric for the predictive model under analysis, model quality metric generator 248 illustratively applies the in situ validation data set to the model under analysis. This is indicated by block 354. It then illustratively generates an error metric that measures the error of the model. This is indicated by block 356. In one example, the error metric is the r2 error metric that measures the square of the error of the model. The model quality metric for the predictive model under analysis can be generated using a wide variety of quality metric mechanisms as well. This is indicated by block 358.

Once the model quality metric has been generated for the predictive model under analysis, the model evaluator logic determines whether that model should be used for controlling machine 100. This is indicated by block 360. For example, threshold logic 252 can determine whether the model quality metric meets a threshold value. This is indicated by block 362. The threshold value may be set based on factors such as the particular application in which machine 100 is being used, historical experience, etc. In one example where the r2 value is used as the quality metric, a threshold of 0.7 or above may be used. This is just one example, and the threshold can be less than or greater than 0.7 as well.

Where multiple different predictive models have been generated, sorting logic 254 can sort the models based upon the quality metric. A decision as to whether the model under analysis should be used can be based on its rank in the sorted list of models. This is indicated by block 364. Model evaluator logic 250 can determine whether the model under analysis is to be used in other ways as well, and this is indicated by block 366.

If, at block 360, it is determined that the model under analysis is to be used, then model selection logic 358 selects that model and provides it to control system 224 for use in controlling machine 100. Control system 224 then generates control signals to control one or more controllable subsystems 226, using the qualified model. This is indicated by block 368 (FIG. 3B) in the flow diagram of FIG. 3. By way of example, the predictive model may be used to predict yield or biomass or other characteristics to be encountered by work machine 100. This is indicated by block 370. The various different type of logic in control system 224 can generate control signals based upon the prediction provided by the predictive model. This is indicated by block 372. The qualified model can be used to generate control signals in a wide variety of other ways as well, and this is indicated by block 374.

The control signals are then applied to one or more of the controllable subsystems in order to control machine 100. This is indicated by block 376 in the flow diagram of FIG. 3. For example, as discussed above, feed rate control logic 262 can generate control signals and apply them to propulsion system 272 to control the speed of machine 100 to maintain a feed rate. This is indicated by block 378. Settings control logic 264 can generate control signals to control settings actuators 276 to adjust the machine settings or configuration. This is indicated by block 380. Route control logic 266 can generate control signals and apply them to steering subsystem 274 to control steering of machine 100. This is indicated by block 382. Power control logic 268 can generate control signals and apply them to power utilization subsystem 278 to control power utilization of machine 100. This is indicated by block 384. A wide variety of other control signals can be generated and applied to a wide variety of other controllable subsystems to control machine 100 as well. This is indicated by block 386.

Unless the operation is complete, as is indicated by block 388, in situ data collection system illustratively resets the in situ data collection measure generated by data measure logic 236 so that it can be determined whether a sufficient amount of in situ data has been collected in order to re-evaluate the current model (or a different model). Resetting the in situ data collection measure is indicated by block 390 in the flow diagram of FIG. 3. As discussed above, even where a current model has been evaluated and is sufficiently accurate to control work machine 100, that same model is iteratively evaluated and refined, as more in situ (field) data is obtained. As the field conditions change, it may be that the model is no longer as accurate as it was initially. Thus, it is iteratively and dynamically evaluated, while machine 100 is performing the operation, to ensure that it is accurate enough to be used in control of machine 100. Thus, once the in situ data collection measure is reset at block 390, processing reverts to block 320 where data aggregation logic 234 continues to aggregate in situ data until enough has been aggregated to perform another evaluation or model generation step.

Returning again to block 360 in FIG. 3, if model evaluation system 220 determines that the predictive model under analysis is not of high enough quality to be used by control system 224 in controlling machine 100, then this triggers evaluation trigger logic 246 to determine whether there are any alternate models that may be generated, or evaluated, to determine whether they should be used, instead of the model that was just evaluated. Determining whether there are any other models is indicated by block 392 (FIG. 3C) in the flow diagram of FIG. 3. Again, an alternate model may be generated or available because different a priori data (e.g., alternate a priori data 204) has been received so that an alternate model can, or already has been, generated. This is indicated by block 392. In addition, it may be that a different model generation mechanism 240-242 can be used (even on the same a priori data as was previously used) to generate an alternate model that can be evaluated. This is indicated by block 394.

In another example, it may be that both a new model generation mechanism has been received, and new a priori data has been received, so that an alternate model can be generated (or already has been generated) using the new mechanism and new a priori data. This is indicated by block 396 in the flow diagram of FIG. 3. Determining whether there are any alternative models to be generated or evaluated can be done in a wide variety of other ways as well, and this is indicated by block 398.

If, at block 392, it is determined that there are no alternative models to generate or evaluate, then model evaluation logic 220 indicates this to operator interface mechanisms 228 and a message is displayed to operator 232 indicating that control of machine 100 is reverting to manual or preset control. In that case, control system 224 receives control inputs from operator 232 through operator interface mechanisms 228, or it can receive preset inputs or it can revert to control using a default model. This is all indicated by block 400 in the flow diagram of FIG. 3.

However, if, at block 392, it is determined that there are alternate models that can be generated or that have been generated and are ready for evaluation, then processing proceeds at block 402 where one or more of the alternate models are generated and/or evaluated to determine whether they are of sufficient quality to be used in work machine 100. The evaluation can be done as described above with respect to FIGS. 338-360 in the flow diagram of FIG. 3.

Model selection logic 258 then determines whether any of the models being evaluated have a high enough quality metric to be used for controlling machine 100. This is indicated by block 404. If not, processing reverts to block 400. It should also be noted that, in one example, multiple alternate models are all evaluated substantially simultaneously. In that case, model selection logic 258 can choose the best alternate model (assuming that its quality is good enough) for controlling machine 100. In another example, only one alternate model is evaluated at a given time.

In either example, if, at block 404, model evaluator logic 250 identifies a model that has a high enough quality metric for controlling machine 100, then model selection logic 258 selects that model for control based upon the selection criteria. This is indicated by block 406. Again, where multiple models are being evaluated, model selection logic 258 may simply select the first model that has a quality metric above a threshold value. This is indicated by block 408. In another example, sorting logic 254 can sort all of the models being evaluated based upon their quality metric, and model selection logic 258 can select the model with the best quality metric value. This is indicated by block 410. The model can be selected in other ways as well, and this is indicated by block 412. Once the model is selected, processing proceeds at block 368 where that model is used to generate control signals for controlling machine 100.

Thus far in the description, it has been assumed that one predictive model is used by control system 224 to control the controllable subsystems 226. However, it may be that different predictive models are used by control system 224 to control different controllable subsystems. In addition, it may be that the outputs of a plurality of different predictive models are used to control a plurality of different controllable subsystems. Similarly, it may be that the models are specific to a given actuator or set of actuators. In that example, a predictive model may be used to generate control signals to control a single actuator or a set of actuators.

Figure 4:
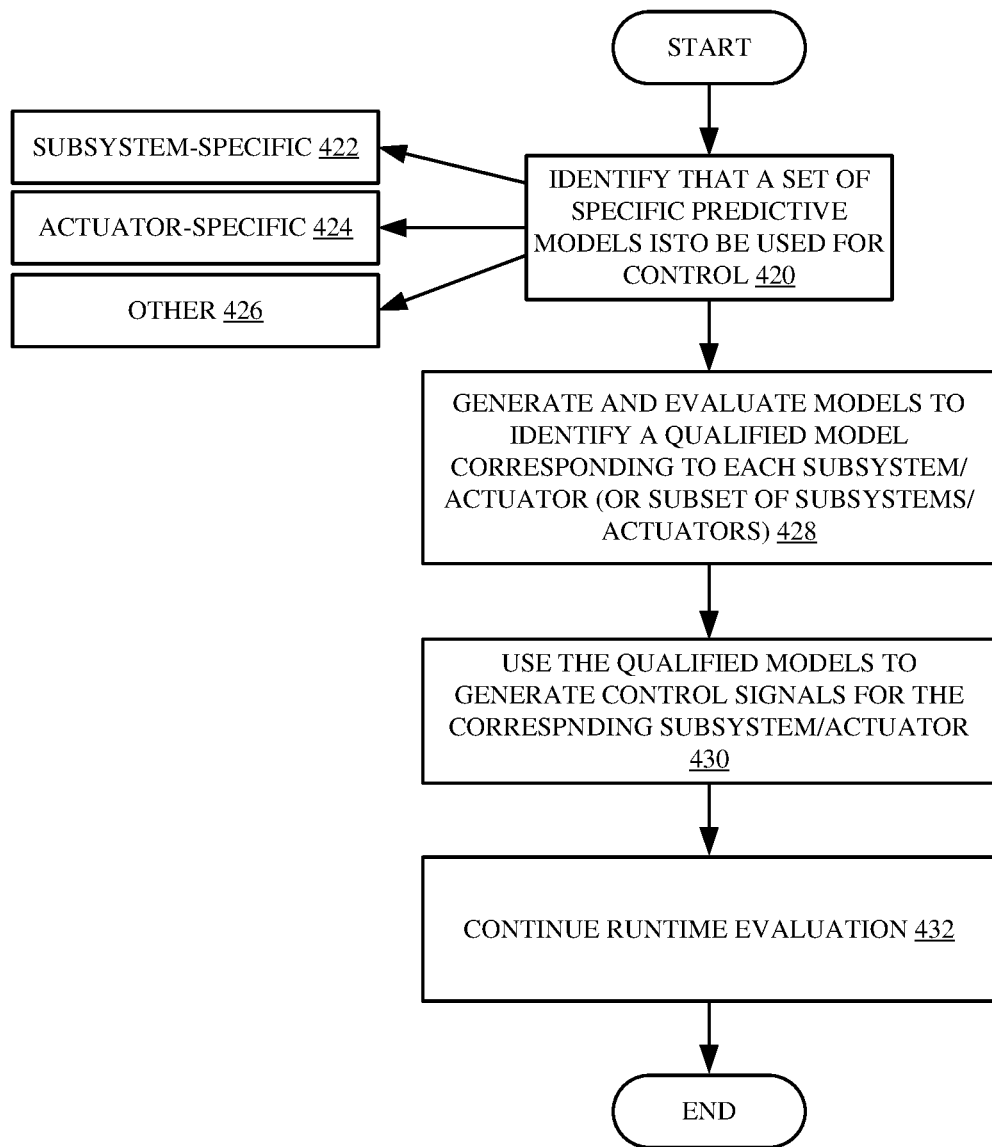
FIG. 4 is a flow chart illustrating another example of the operation of the architecture illustrated in FIG. 2, dynamically generating actuator-specific or subsystem-specific control models.

FIG. 4 is a flow diagram illustrating one example of the operation of architecture 180 in an example where multiple different predictive models are used to control different controllable subsystems. It is thus first assumed that model generator system 218 identifies that a set of specific predictive models is to be used for controlling machine 100, instead of a single predictive model. This is indicated by block 420 in the flow diagram of FIG. 4. The predictive models may be subsystem-specific models so that a different predictive model is used to control each of the different controllable subsystems 226. This is indicated by block 422 in the flow diagram of FIG. 4. They may be actuator-specific models so that a different predictive model is used by control system 224 to control a different actuator or set of actuators. This is indicated by block 424. The models may be configured in other ways, so that, for instance, the output of a plurality of different models is used to control a single subsystem, or so that a single model is used to control a subset of the controllable subsystems while another model is used to control the remaining controllable subsystems, or a different subset of those subsystems. Identifying the set of specific predictive models in other ways is indicated by block 426 in the flow diagram of FIG. 4.

In that example, model generator system 218 then generates a set of specific predictive models to be evaluated, and model evaluation system 220 evaluates those specific predictive models. Model evaluation system 220 illustratively identifies a qualified model corresponding to each subsystem/actuator (or subset of the subsystems/actuators) on work machine 100. This is indicated by block 428 in the flow diagram of FIG. 4.

Model selection logic 258 selects a model for each of the systems/actuators and provides it to control system 224. Control system 224 uses the qualified models to generate signals for the corresponding subsystems/actuator (or subset of subsystems/actuators). This is indicated by block 430 in the flow diagram of FIG. 4.

By way of example, it may be that the traction in the field is modeled by a predictive model. The output of that model may be used by control system 224 to control the steering subsystem 274 to steer around muddy or wet areas where traction is predicted to be insufficient. The in situ data, in that case, may be soil moisture data which is sensed by a soil moisture sensor on machine 100 and provided as the actual, in situ, field data for the predictive traction model. In another example, the header lift actuator may be controlled by a separate predictive model that predicts topography. The in situ data may indicate the actual topography over which machine 100 is traveling. Of course, there are a wide variety of other types of predictive models that can be used by control system 224 to control individual actuators, sets of actuators, individual subsystems, sets of subsystems, etc.

As with the single model example discussed above with respect to FIG. 3, each of the plurality of different predictive models will illustratively be dynamically and iteratively evaluated. Similarly, they can each be replaced by an alternate model, if, during the evaluation process, it is found that an alternate model performs better. Thus, in such an example, multiple predictive models are continuously, dynamically, and iteratively updated, improved, and evaluated against alternate models. The models used for control can be swapped out with alternate models, based upon the evaluation results, in near real time, during operation of the work machine in the field. Continuing the runtime evaluation, in this way, is indicated by block 432 in the flow diagram of FIG. 4.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
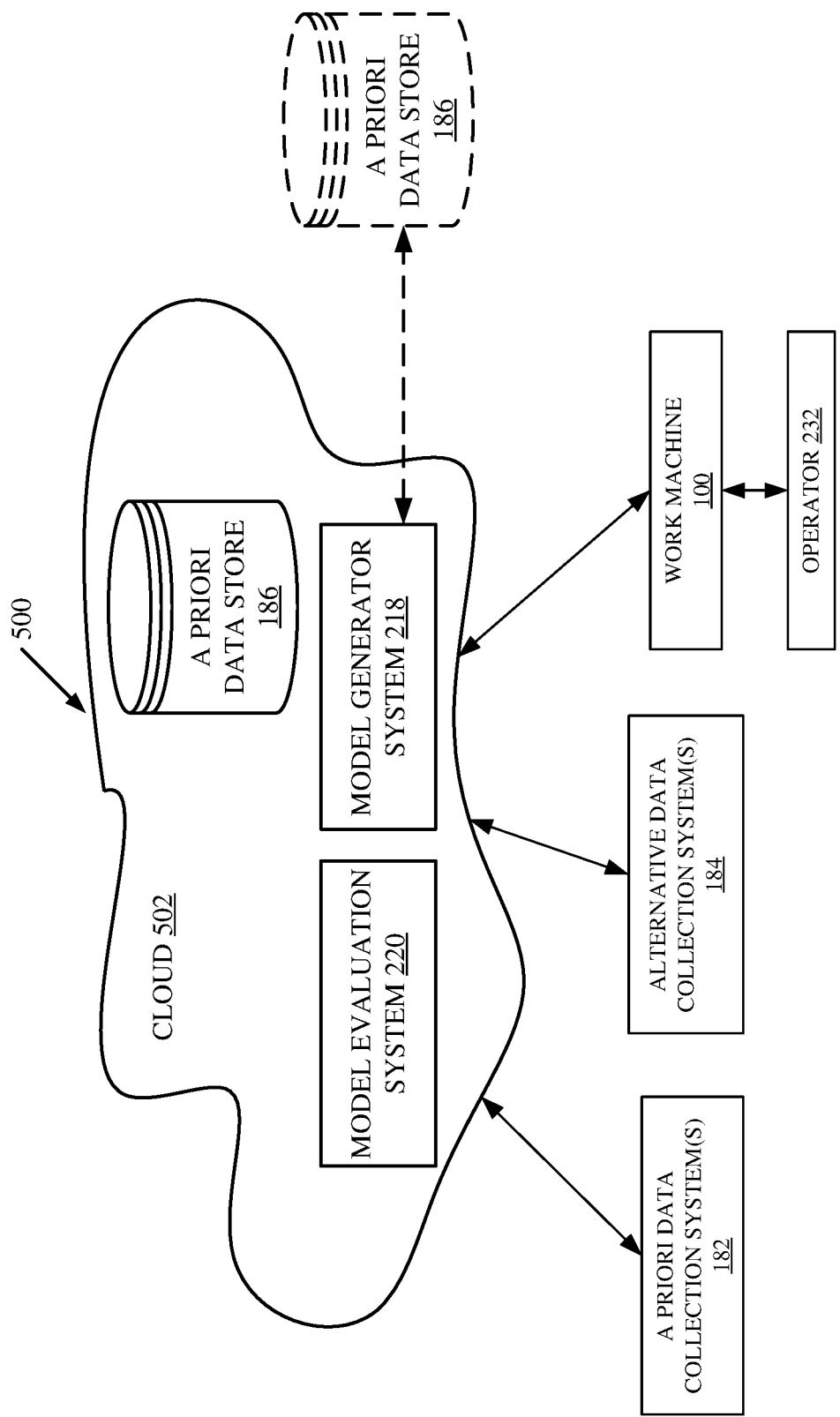
FIG. 5 shows a block diagram of the architecture illustrated in FIG. 1, deployed in a remote server environment.

FIG. 5 is a block diagram of harvester 100, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 2 and they are similarly numbered. FIG. 5 specifically shows that model generation system 218, model evaluation system 220 and a priori data store 186 can be located at a remote server location 502. Therefore, harvester 100 accesses those systems through remote server location 502.

FIG. 5 also depicts another example of a remote server architecture. FIG. 4 shows that it is also contemplated that some elements of FIG. 2 are disposed at remote server location 502 while others are not. By way of example, data store 186 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester or transfers information to the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
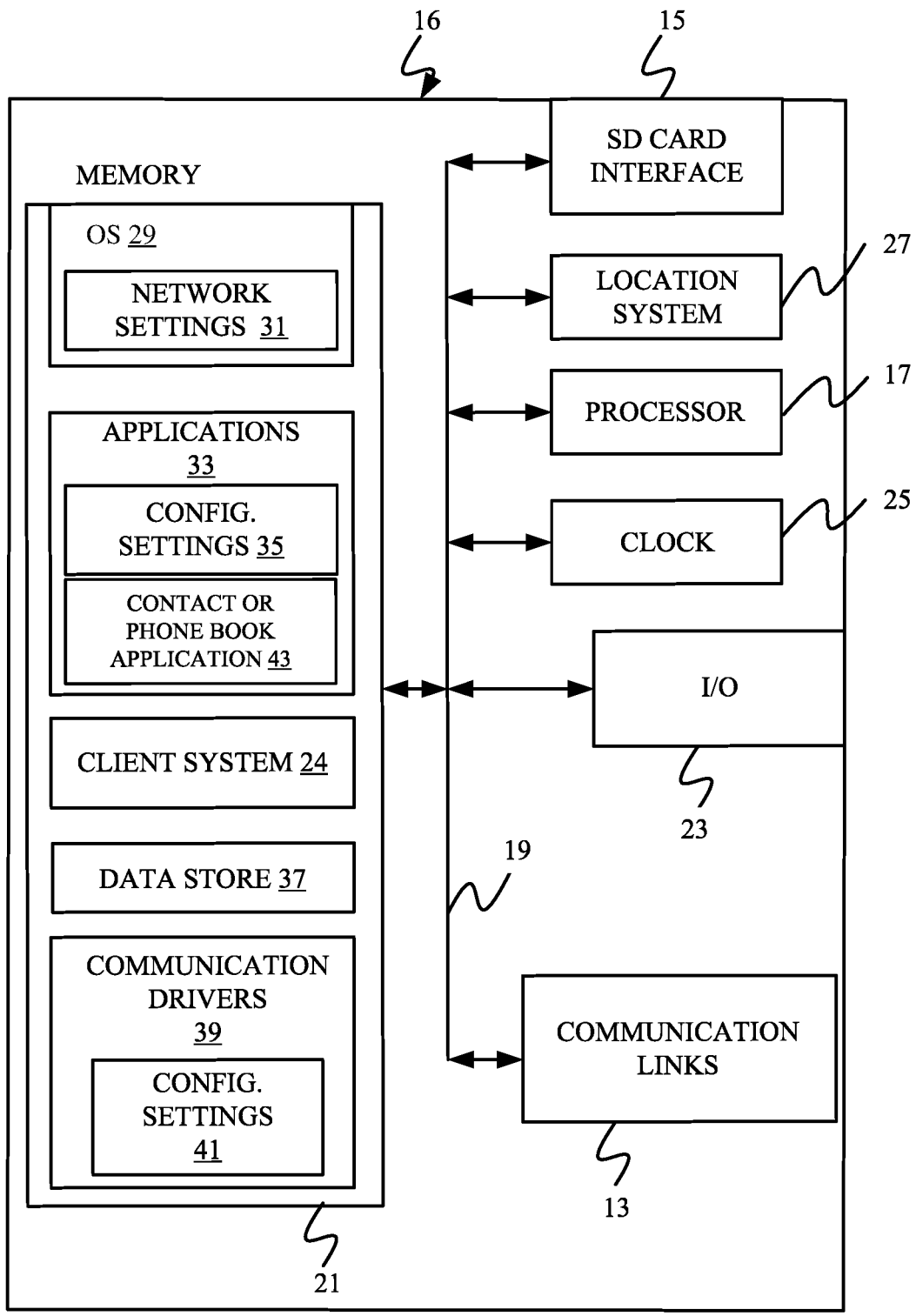
FIGS. 6-8 show examples of mobile devices that can be used in the architectures shown in the previous figures.
Figure 7:
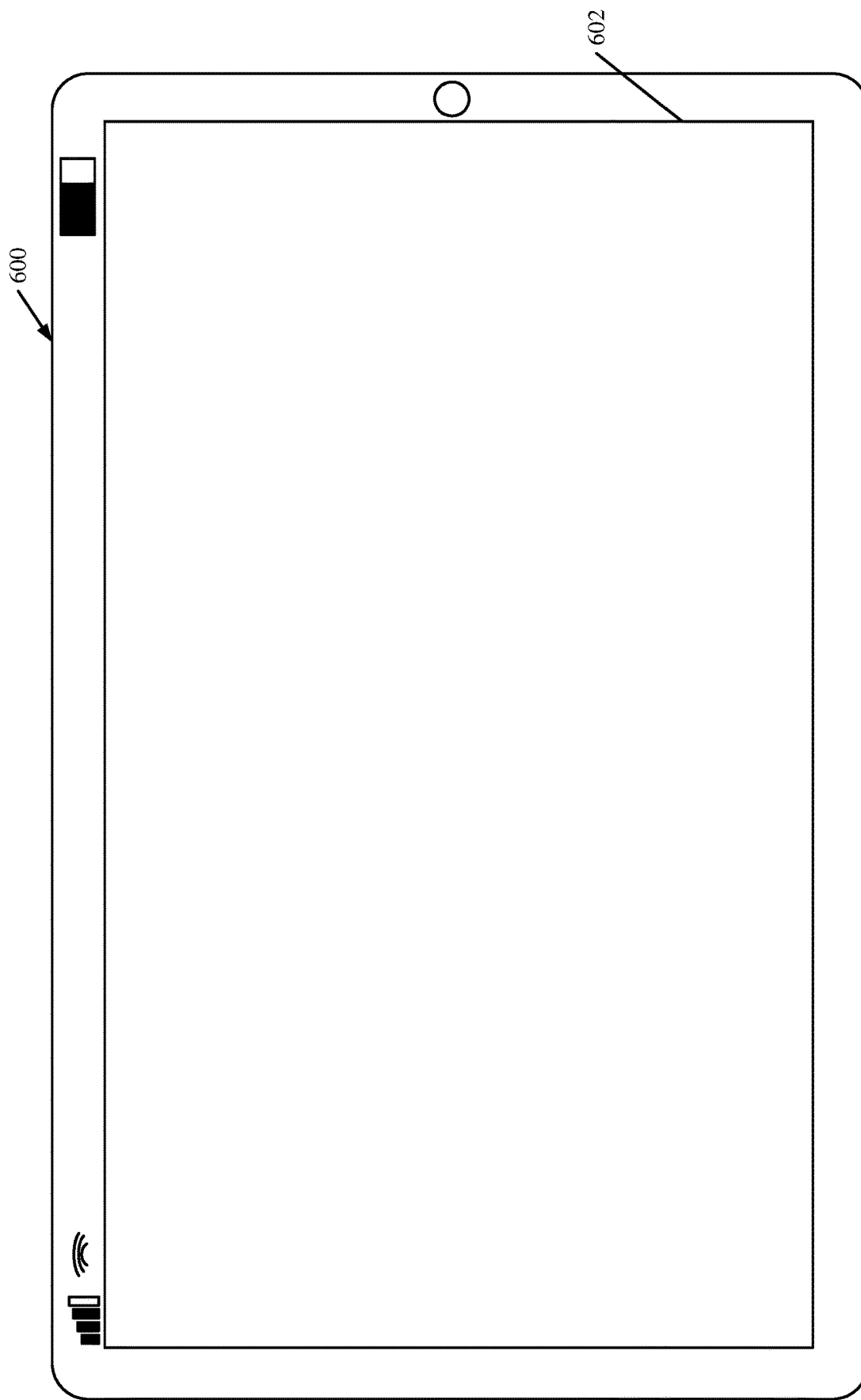
Figure 8:
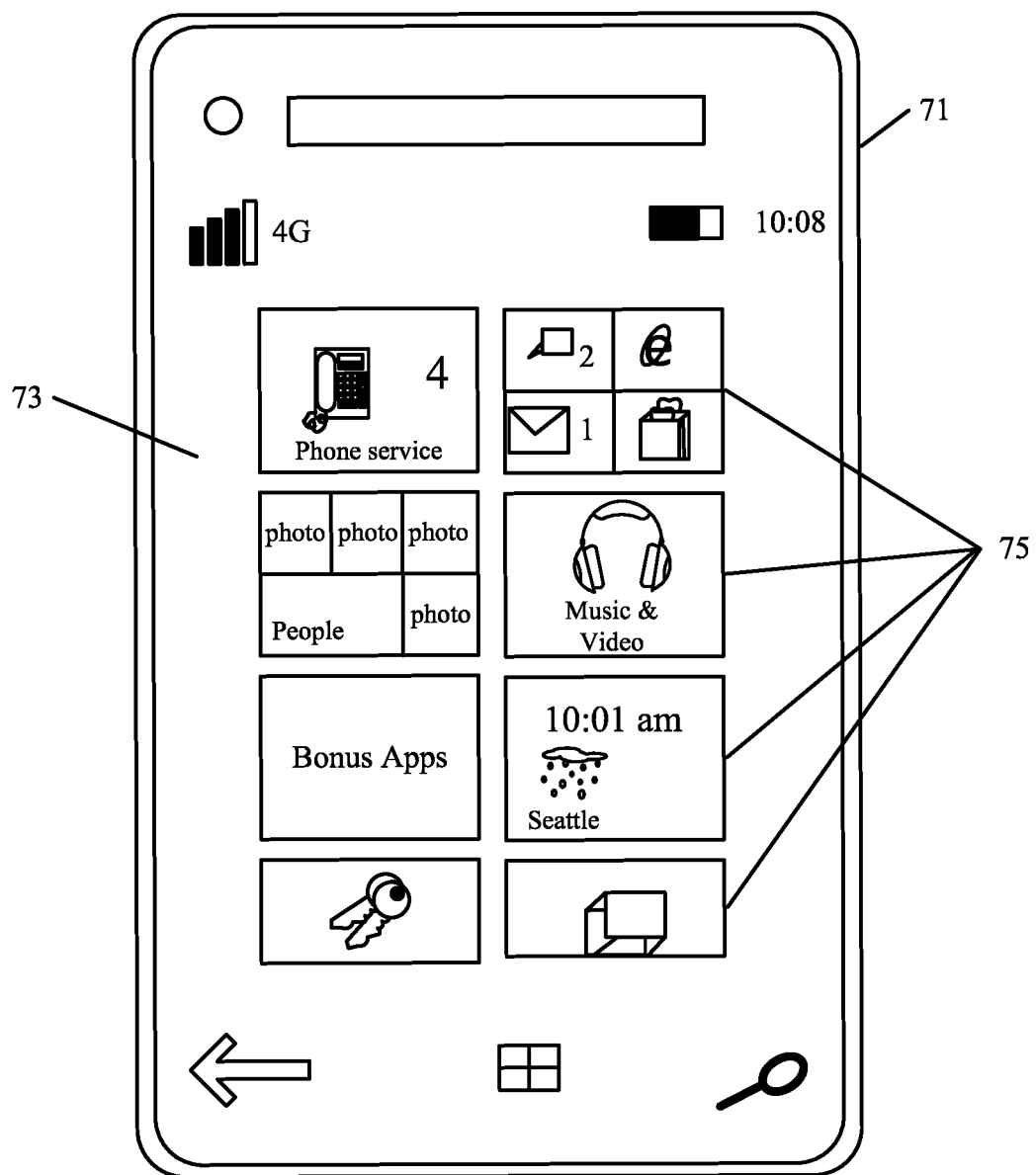

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
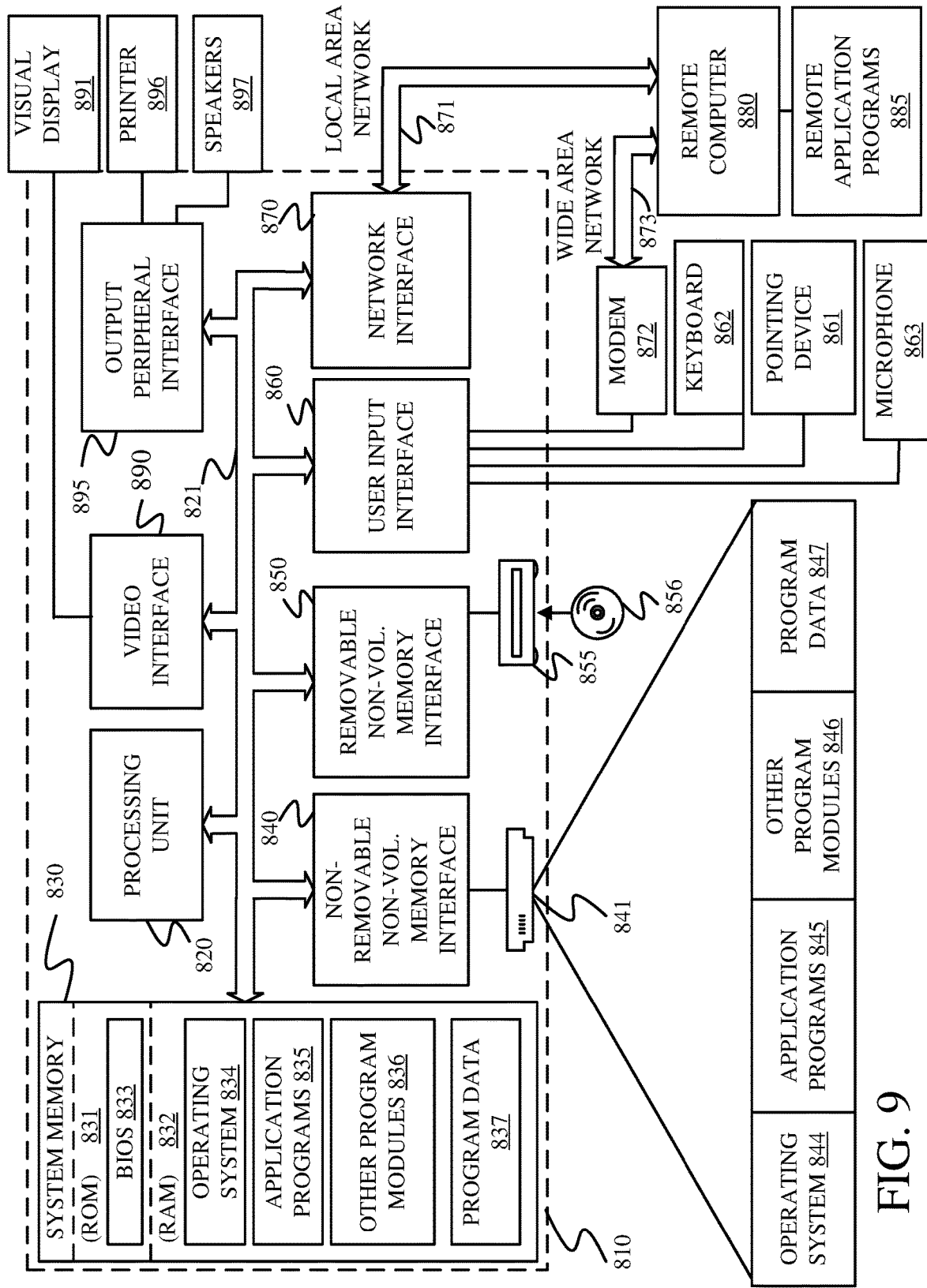
FIG. 9 is a block diagram showing one example of a computing environment that can be used in the architectures shown in the previous figures.

FIG. 9 is one example of a computing environment in which elements of FIG. 2, or parts of it, (for example) can be deployed. With reference to FIG. 9, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

Example 1 is a method of controlling a machine on a worksite to perform an operation comprising:
- identifying geo-referenced characteristic data for the worksite that was generated prior to the machine performing the operation at the worksite;
- collecting worksite data, with a sensor on the machine, as the machine is performing an operation at the worksite, the worksite data corresponding to a portion of the worksite;
- generating a predictive model based on the geo-referenced characteristic data and the worksite data;
- calculating an error value indicative of model error based on a comparison of model values from the generated predictive model to worksite values in the collected worksite data;
- calculating a model quality metric, for the predictive model, indicative of model accuracy, based on the error value;
- determining, while the machine is performing the operation at the worksite, whether the predictive model is a qualified predictive model based on the calculated model quality metric and
- if so, controlling a subsystem of the machine, using the qualified predictive model, to perform the operation.

Example 2 is the method of any or all previous examples, wherein determining whether the predictive model is a qualified predictive model comprises:
- determining whether the model quality metric meets a model quality threshold.

Example 3 is the method of any or all previous examples, and further comprising:
- if the predictive model is determined not to be a qualified predictive model, then
- identifying different geo-referenced characteristic data for generating a different predictive model;
- generating the different predictive model;
- determining, while the machine is performing the operation at the worksite, whether the different predictive model is a qualified model; and
- if so, controlling a subsystem of the machine, using the different predictive model to perform the operation.

Example 4 is the method of any or all previous examples, wherein identifying geo-referenced characteristic data comprises:
- obtaining a priori georeferenced characteristic data, from a remote system, corresponding to the worksite.

Example 5 is the method of any or all previous examples, wherein collecting worksite data comprises:
- aggregating worksite data corresponding to a portion of the worksite, as the machine is performing an operation at the worksite.

Example 6 is the method of any or all previous examples, wherein the machine has a plurality of different subsystems and wherein controlling a subsystem comprises:
- controlling the plurality of different subsystems on the machine.

Example 7 is the method of any or all previous examples, wherein generating a predictive model comprises:
- generating a plurality of different predictive models, based on a priori data and the worksite data, for the different subsystems of the work machine.

Example 8 is the method of any or all previous examples, wherein calculating a model quality metric comprises:
- calculating a plurality of different model quality metrics values for the different predictive models, wherein determining whether the predictive model is a qualified predictive model comprises determining whether each of the plurality of predictive models are qualified predictive models based on the calculated model quality metrics values.

Example 9 is the method of any or all previous examples and further comprising:
- if the plurality of different predictive models are qualified predictive models, then controlling each of the different subsystems of the work machine on the worksite, using a different one of the plurality of different predictive models.

Example 10 is the method of any or all previous examples and further comprising:
- iteratively repeating steps of collecting worksite data, updating the predictive model based on the worksite data, calculating a model quality metric for the updated predictive model and determining whether the predictive model is a qualified predicative model, while the machine is performing the operation.

Example 11 is the method of any or all previous examples, wherein geo-referenced characteristic data for the worksite comprises one of:
- geo-referenced topographic characteristic data for the worksite;
- geo-referenced soil characteristic data for the worksite;
- geo-referenced crop characteristic data for the worksite; or
- geo-referenced weather characteristic data for the worksite.

Example 12 is a computing system on a work machine comprising:
- a communication system configured to identify a priori, geo-referenced characteristic data for a worksite;
- an in situ data collection system that collects worksite data, with a sensor on a machine, as the work machine is performing an operation at the worksite, the worksite data corresponding to a portion of the worksite;
- a model generator system configured to receive the a priori, geo-referenced characteristic data and worksite data and generate a predictive model based on the a priori, geo-referenced characteristic data and the worksite data, as the work machine is performing the operation at the worksite, using a model generation mechanism, the predictive model including predictive values of a characteristic of the worksite; and
- a control system that, controls a subsystem of the machine using the predictive model.

Example 13 is the computing system of any or all previous examples and further comprising:
- a model evaluation system configured to calculate a model quality metric for the predictive model and determine whether the predictive model is a qualified predictive model; and
- wherein the control system controls the subsystem using the predictive model if the predictive model is a qualified predictive model.

Example 14 is the computing system of any or all previous examples, wherein the model evaluation system comprises:
- a model quality metric generator configured to calculate the model quality metric for the predictive model.

Example 15 is the computing system of any or all previous examples, wherein the model evaluation system comprises:

evaluation trigger logic configured to detect an evaluation trigger and, in response, generate a trigger output for the model evaluation system to evaluate an alternative predictive model.

Example 16 is the computer system of any or all previous examples, wherein the model generation system is configured to, in response to the trigger output, generate the alternative predictive model using alternative a priori, geo-referenced characteristic data for the worksites.

Example 17 is the computer system of any or all previous examples, wherein the model generation system is configured to, in response to the trigger output, generate the alternative predictive model using an alternative model generation mechanism.

Example 18 is the computing system of any or all previous examples wherein the model generator system is configured to generate a plurality of predictive models each corresponding to a specific controllable subsystem, and wherein the control system uses each of the predictive models to control the corresponding specific controllable subsystem.

Example 19 is the computing system of any or all previous examples, wherein the a priori, geo-referenced characteristic data are generated prior to the work machine performing the operation at the worksite.

Example 20 is a work machine comprising:
a communication system configured to receive geo-referenced characteristic data for a worksite;
an in situ data collection system configured to collect worksite data, with a sensor on the work machine, as the work machine is performing an operation at the worksite, for a portion of the worksite;
a plurality of controllable subsystems;
a model generator system configured to generate a plurality of different predictive models, based on the geo-referenced characteristic data and the worksite data, each corresponding to a different controllable subsystem of the plurality of controllable subsystems of the work machine, the plurality of different predictive models including predictive values of an at least one characteristic of the worksite to be encountered by the work machine; and
a control system that generates control signals to control each of the controllable subsystems using a corresponding predictive model.

Example 21 is the work machine of any or all previous examples, and further comprising:
a model evaluation system configured to calculate a model quality metric for each of the predictive models and determine whether each of the predictive models is a qualified predictive model based on the model quality metrics, wherein the control system generates the control signals to control each of the controllable subsystems using a corresponding qualified predictive model.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a machine on a worksite to perform an operation comprising:
identifying geo-referenced characteristic data for the worksite that was generated prior to the machine performing the operation at the worksite;
collecting worksite data, with a sensor on the machine, as the machine is performing the operation at the worksite, the worksite data corresponding to a portion of the worksite;
generating a predictive model based on the geo-referenced characteristic data and the worksite data;
calculating an error value indicative of model error based on a comparison of model values from the generated predictive model to worksite values in the collected worksite data;
calculating a model quality metric, for the predictive model, indicative of model accuracy, based on the error value;
determining, while the machine is performing the operation at the worksite, whether the predictive model is a qualified predictive model based on the calculated model quality metric and if so, controlling a subsystem of the machine, using the qualified predictive model, to perform the operation.

2. The method of claim 1, wherein determining whether the predictive model is a qualified predictive model comprises:
determining whether the model quality metric meets a model quality threshold.

3. The method of claim 1, and further comprising:
if the predictive model is determined not to be a qualified predictive model, then identifying different geo-referenced characteristic data for generating a different predictive model;
generating the different predictive model;
determining, while the machine is performing the operation at the worksite, whether the different predictive model is a qualified model; and
if so, controlling a subsystem of the machine, using the different predictive model to perform the operation.

4. The method of claim 1, wherein identifying geo-referenced characteristic data comprises:
obtaining a priori georeferenced characteristic data, front a remote system, corresponding to the worksite.

5. The method of claim 1, wherein collecting worksite data comprises;
aggregating worksite data corresponding to the portion of the worksite as the machine is performing an operation at the worksite.

6. The method of claim 1, wherein the machine has a plurality of different subsystems and wherein controlling a subsystem comprises;
controlling the plurality of different subsystems on the machine.

7. The method of claim 6, wherein generating a predictive model comprises:
generating a plurality of different predictive models, based on a priori data and the worksite data, for the different subsystems of the work machine.

8. The method of claim 7, wherein calculating a model quality metric comprises:
calculating a plurality of different model quality metrics values for the different predictive models, wherein determining whether the predictive model is a qualified predictive model comprises determining whether each of the plurality of predictive models are qualified predictive models based on the calculated model quality metrics values.

9. The method of claim 1 and further comprising:
if the plurality of different predictive models are qualified predictive models, then controlling each of die different subsystems of the work machine on the worksite, using a different one of the plurality of different predictive models.

10. The method of claim 1 and further comprising:
iteratively repeating steps of collecting worksite data, updating the predictive model based on the worksite data, calculating a model quality metric for the updated predictive model and determining whether the updated predictive model is a qualified predicative model, while the machine is performing the operation.

11. The method of claim 1, wherein geo-referenced characteristic data for the worksite comprises one of:
geo-referenced topographic characteristic data for the worksite;
geo-referenced soil characteristic data for the worksite;
geo-referenced crop characteristic data for the worksite; or
geo-referenced weather characteristic data for the worksite.

12. A computing system on a work, machine comprising:
a communication system: configured to identify a priori, geo-referenced characteristic data for a worksite;
an in situ data collection system that collects worksite data, with a sensor on a machine, as the work machine is performing an operation at the worksite the worksite data corresponding to a portion of the work site;
a model generator system configured to receive the a priori, geo-referenced characteristic data and the worksite data and generate a predictive Model based on the a priori, geo-referenced characteristic data and the worksite data, as the work machine is performing the operation the worksite, using a model generation mechanism, the predictive model including predictive values of a characteristic f the worksite; and
a control system that controls subsystem of the machine using the predictive model.

13. The computing system of claim 12 and further comprising:
a model evaluation system configured to calculate a model quality metric for the predictive model and determine whether the predictive model is a qualified predictive model; and
wherein the control system controls the subsystem using, the predictive model if the predictive model is a qualified predictive model.

14. The Computing system of claim 13, wherein the model evaluation system comprises;
a model quality metric generator configured to calculate the model quality metric for the predictive model.

15. The computing system of claim 14, wherein the model evaluation system comprises:
evaluation trigger logic configured to detect an evaluation trigger and in response, generate a trigger output for the model evaluation system to evaluate an alternative predictive model.

16. The computer system of claim 15, wherein the model generation system is configured to, in response to the trigger output, generate the alternative predictive model using alternative a priori, geo-referenced characteristic data for the worksites.

17. The computer system of claim 15, wherein the model generation system is configured to, in response to the trigger output, generate the alternative predictive model using an alternative model generation mechanism.

18. The computing system of claim 17 wherein the Model generator system is configured to generate a plurality of predictive models each corresponding to a specific controllable subsystem, and wherein the control system uses each of the predictive models to control the corresponding to specific controllable subsystem.

19. The computing system of claim 12 wherein the a priori, geo-referenced characteristic data are generated prior to the work machine performing the operation at the worksite.

20. A work machine comprising:
a communication system configured receive geo-referenced characteristic data for a worksite;
an in situ data collection system configured to collect worksite data, with a sensor on the work machine, as the work machine is performing an operation at the worksite, for a portion of the worksite,
a plurality of controllable subsystems:
a model generator system configured to generate a plurality of different predictive models, based on the geo-referenced characteristic data and the worksite data, each corresponding to a different controllable subsystem of the plurality of controllable subsystems of the work machine, the plurality, of different predictive models including predictive values of an at least one characteristic of the worksite to be encountered by the work machine; and
a control system that generates control signals to control each of the controllable subsystems using corresponding predictive model.

21. The work machine of claim 20, and further comprising:
a model evaluation system configured to Calculate a model quality metric for each of the predictive models and determine whether each of the predictive models is a qualified predictive model based on the model quality metrics, wherein the control system generates the control signals to control each of the controllable subsystems using a corresponding qualified predictive model.

* * * * *